United States Patent
Be'ery et al.

(10) Patent No.: US 11,930,110 B2
(45) Date of Patent: Mar. 12, 2024

(54) SYSTEM AND METHOD FOR KEY RECOVERY AND VERIFICATION IN BLOCKCHAIN BASED NETWORKS

(71) Applicant: KZEN NETWORKS LTD, Tel Aviv (IL)

(72) Inventors: Tal Arieh Be'ery, Petach Tikva (IL); Ouriel Ohayon, Tel Aviv (IL); Omer Shlomovits, Petach Tikva (IL); Gary Benattar, Netanya (IL)

(73) Assignee: ZENGO LTD, Tel Aviv (IL)

(*) Notice: Subject to any disclaimer, the term of this patent is extended or adjusted under 35 U.S.C. 154(b) by 361 days.

(21) Appl. No.: 17/426,769

(22) PCT Filed: Jan. 29, 2020

(86) PCT No.: PCT/IL2020/050111
§ 371 (c)(1),
(2) Date: Jul. 29, 2021

(87) PCT Pub. No.: WO2020/157756
PCT Pub. Date: Aug. 6, 2020

(65) Prior Publication Data
US 2022/0103356 A1 Mar. 31, 2022

Related U.S. Application Data

(60) Provisional application No. 62/798,892, filed on Jan. 30, 2019.

(51) Int. Cl.
*H04L 29/06* (2006.01)
*H04L 9/00* (2022.01)
*H04L 9/08* (2006.01)

(52) U.S. Cl.
CPC ............ *H04L 9/0894* (2013.01); *H04L 9/008* (2013.01)

(58) Field of Classification Search
CPC ......... H04L 9/0894; H04L 9/008; H04L 9/50; H04L 9/3239
See application file for complete search history.

(56) References Cited

U.S. PATENT DOCUMENTS

| 5,907,618 A | 5/1999 | Gennaro et al. |
| 6,122,742 A | 9/2000 | Young et al. |

(Continued)

FOREIGN PATENT DOCUMENTS

| EP | 0912011 | 4/1999 | |
| WO | WO 2017/151861 | 9/2017 | |
| WO | WO-2017151861 A1 * | 9/2017 | ......... G06Q 20/3823 |

OTHER PUBLICATIONS

Kobeissi et al., "Automated Verification for Secure Messaging Protocols and their Implementations: A Symbolic and Computational Approach", 2017 IEEE European Symposium on Security and Privacy, (Year: 2017).*

(Continued)

*Primary Examiner* — Morshed Mehedi
(74) *Attorney, Agent, or Firm* — PEARL COHEN ZEDEK LATZER BARATZ LLP

(57) ABSTRACT

Methods and systems of recovering a cryptographic key associated with a blockchain based computer network, including encryption of at least a portion of a cryptographic key of the computer network with a recovery public key, sending of the encrypted at least a portion of the cryptographic key to at least one second computing device, sending of a recovery private key to a recovery escrow service, detection that the at least one first computing device is unavailable, publishing the recovery private key in a public repository, retrieving the recovery private key from the public repository, and decryption of the encrypted at least a portion of the cryptographic key by the at least one second computing device.

13 Claims, 6 Drawing Sheets

(56) References Cited

U.S. PATENT DOCUMENTS

| | | | |
|---|---|---|---|
| 6,160,891 | A | 12/2000 | Al-Salqan |
| 6,549,626 | B1 | 4/2003 | Al-Salqan |
| 2004/0249817 | A1* | 12/2004 | Liu .................. H04L 63/0435 707/999.009 |
| 2012/0204032 | A1* | 8/2012 | Wilkins ................ H04L 9/321 713/170 |
| 2013/0212073 | A1* | 8/2013 | Cochrane ................ G09B 7/02 707/687 |
| 2016/0269179 | A1 | 9/2016 | White et al. |
| 2016/0365973 | A1* | 12/2016 | van Deventer ....... H04L 9/0625 |
| 2018/0367298 | A1 | 12/2018 | Wright et al. |
| 2018/0374131 | A1* | 12/2018 | Currie ............... G06Q 30/0617 |
| 2019/0349426 | A1* | 11/2019 | Smith .................... H04W 4/08 |
| 2021/0097187 | A1* | 4/2021 | Guyomarc'h ......... H04L 9/0894 |
| 2022/0103356 | A1* | 3/2022 | Be'ery .................. H04L 9/008 |

OTHER PUBLICATIONS

PCT International Search Report for International App. No. PCT/IL2020/050111 dated Apr. 27, 2020.

European Search Report for EP application No. 20749057, dated Jan. 9, 2023.

* cited by examiner

SYSTEM AND METHOD FOR KEY RECOVERY AND VERIFICATION IN BLOCKCHAIN BASED NETWORKS

CROSS-REFERENCE TO RELATED APPLICATIONS

This application is a National Phase Application of PCT International Application No. PCT/IL2020/050111, International Filing Date Jan. 29, 2020, claiming the benefit of U.S. Provisional Patent Application No. 62/798,892, filed Jan. 30, 2019 which is hereby incorporated by reference.

FIELD OF THE INVENTION

The present invention relates to blockchain technology. More particularly, the present invention relates to systems and methods for management of cryptographic keys in blockchain based computer networks.

BACKGROUND OF THE INVENTION

Blockchain technology can allow a consensus of replicated, shared, and/or synchronized digital data in a peer-to-peer network that can be geographically spread across multiple sites. Currently, the security of all blockchain based cryptocurrency wallets typically solely depends on the security of its private keys, that can be used to digitally sign a user transaction and/or thereby prove its validity. The majority of cryptocurrency wallets either store the key on a customer's device or on the service's side. Therefore, when these devices are compromised a cyber-theft is possible.

In typical classic blockchain software implementations, a client locally generates a private key and a corresponding public key. The public key can be used to create an address and/or the messages to be signed can be transactions of value between such addresses (or accounts). Verification of transaction validity can be done publicly by the blockchain maintainers using, e.g., the relevant addresses public keys, while the key generation can be done locally using, e.g., the client's secret key.

In order to achieve a distributed signing for blockchain algorithms, it may be required to change the key generation (e.g., generating a private-public keypair) and/or signing protocols without, for example, affecting the public verification protocol with validating a signature on a message using the public key.

Distributed key generation protocols may involve two main parts: a local secret data being generated (similar to the original centralized key generation protocol) by each of the parties, and communication between the participating parties to provide the necessary view to all other parties to compute the composed public key (and resulting address), and also later generate the signatures.

Distributed signing may occur only after the key generation and usually involves interactive protocol for each party: receiving a message to sign, and applying local computation on the message using local data previously generated on the key generation protocol to distribute the results and compute signature locally.

In case of a central service that holds the customer's private keys, it is susceptible to attacks on the private keys' confidentiality and availability. Using multiple keys to sign a blockchain transaction (often named 'MultiSig') is typically considered to be a safe way to manage private keys. The splitting of the signature responsibility between multiple parties, and specifically between server and client, can eliminate the single point of failure confidentiality problems associated with the atomic private key, by, for example, effectively splitting the private key to client share and server share. However, this splitting can introduce multiple points of failure to the key availability, since if one of the shares is lost the customer cannot longer sign.

Some 'MultiSig' service providers use a third-party service such as key recovery services (KRS) that can require the use of "two out of three" signing model. In case of server unavailability, the model can collapse to a "two out of two" signing model, and the client can sign transaction together with the KRS as in non-MultiSig systems. Therefore, it can be desirable to provide a solution for the case of server unavailability.

SUMMARY OF THE INVENTION

There is thus provided, in accordance with some embodiments of the invention, a method of recovering a cryptographic key associated with a blockchain based computer network, the method including: encrypting, by at least one first computing device, at least a portion of a cryptographic key of the computer network with a recovery public key, sending, by the at least one first computing device, the encrypted at least a portion of the cryptographic key to at least one second computing device, sending, by the at least one first computing device, a recovery private key to a recovery escrow service, detecting that the at least one first computing device is unavailable, publishing, by the recovery escrow service, the recovery private key in a public repository, retrieving, by the at least one second computing device, the recovery private key from the public repository, and decrypting the encrypted at least a portion of the cryptographic key by the at least one second computing device.

In some embodiments, the recovery escrow service stores the recovery private key, and instructions to publish the recovery private key are provided by a third party. In some embodiments, the third party periodically publishes a status report of the at least one first computing device in a public repository to be retrieved by the at least one second computing device. In some embodiments, the recovery escrow service is on an external computing device. In some embodiments, the at least one second computing device includes a mobile computing device. In some embodiments, the at least one second computing device is connected to the computer network, and a transaction is added to a ledger of the computer network, in accordance with the received signed at least a portion of the cryptographic key.

There is thus provided, in accordance with some embodiments of the invention, a method of verifying that an encrypted cryptographic private key associated with a blockchain based computer network can be decrypted, the method including: encrypting, by at least one first computing device, at least a portion of a cryptographic key of the computer network with a recovery public key, wherein the encryption is carried out using an homomorphically additive encryption scheme, sending, by the at least one first computing device, the encrypted at least a portion of the cryptographic key to at least one second computing device, retrieving, by at least one second computing device, the recovery public key from the at least one first computing device; and verifying, by the at least one second computing device, that the encrypted at least a portion of the cryptographic key is compatible to be decrypted by a recovery private key, based on the retrieved recovery public key and the corresponding public key of the at least a portion of the cryptographic key.

In some embodiments, the at least one first computing device sends the recovery private key to a recovery escrow service, the at least one first computing device periodically sends an arbitrary message to the recovery escrow service, wherein the recovery message is signed by the recovery private key, the signed arbitrary message is published in a public repository, the at least one second computing device retrieves the signed arbitrary message from the public repository, the at least one second computing device verifies that the encryption of the signed arbitrary message is compatible with the recovery public key, and the at least one second computing device verifies that the recovery escrow service has the recovery private key. In some embodiments, the encryption is carried out using a verifiable homomorphic ElGamal encryption.

There is thus provided, in accordance with some embodiments of the invention, a system for recovery of a cryptographic key associated with a blockchain based computer network, the system including: at least one first computing device, configured to: encrypt at least a portion of a cryptographic key of the computer network with a recovery public key, and send a recovery private key to a recovery escrow service, at least one second computing device, in communication with the at least one first computing device, and configured to: receive the encrypted at least a portion of the cryptographic key from the at least one first computing device, detect that the at least one first computing device is unavailable, retrieve the recovery private key from a public repository, wherein the recovery private key is published by the recovery escrow service, and decrypt the encrypted at least a portion of the cryptographic key.

In some embodiments, the recovery escrow service stores the recovery private key, and instructions to publish the recovery private key are provided by a third party. In some embodiments, a status report of the at least one first computing device in a public repository is periodically published by the third party. In some embodiments, the at least one second computing device includes a mobile computing device. In some embodiments, the at least one second computing device is connected to the computer network, and a transaction is added to a ledger of the computer network, in accordance with the received signed at least a portion of the cryptographic key.

There is thus provided, in accordance with some embodiments of the invention, a system for verification that a cryptographic key associated with a blockchain based computer network can be decrypted, the system including: at least one first computing device, configured to: encrypt at least a portion of a cryptographic key of the computer network with a recovery public key, wherein the encryption is carried out using an homomorphically additive encryption scheme, at least one second computing device, in communication with the at least one first computing device, and configured to: receive the encrypted at least a portion of the cryptographic key from the at least one first computing device, retrieve a recovery public key from the at least one first computing device, and verify that the encrypted at least a portion of the cryptographic key is compatible to be decrypted by the recovery private key, based on the retrieved recovery public key and the corresponding public key of the at least a portion of the cryptographic key.

In some embodiments, the at least one first computing device is further configured to send the recovery private key to a recovery escrow service and to periodically send an arbitrary message to a recovery escrow service, wherein the arbitrary message is signed by the recovery private key, the recovery escrow service is further configured to publish the signed arbitrary message in a public repository, and the at least one first computing device is further configured to: retrieve the signed arbitrary message from the public repository, verify that the encryption of the signed arbitrary message is compatible with the recovery public key, and verify that the recovery escrow service has the recovery private key.

In some embodiments, the recovery escrow service in on an external computing device. In some embodiments, the at least one second computing device includes a mobile computing device. In some embodiments, the at least one second computing device is connected to the computer network, and a transaction is added to a ledger of the computer network, in accordance with the received signed at least a portion of the cryptographic key. In some embodiments, the encryption is carried out using a verifiable homomorphic ElGamal encryption.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
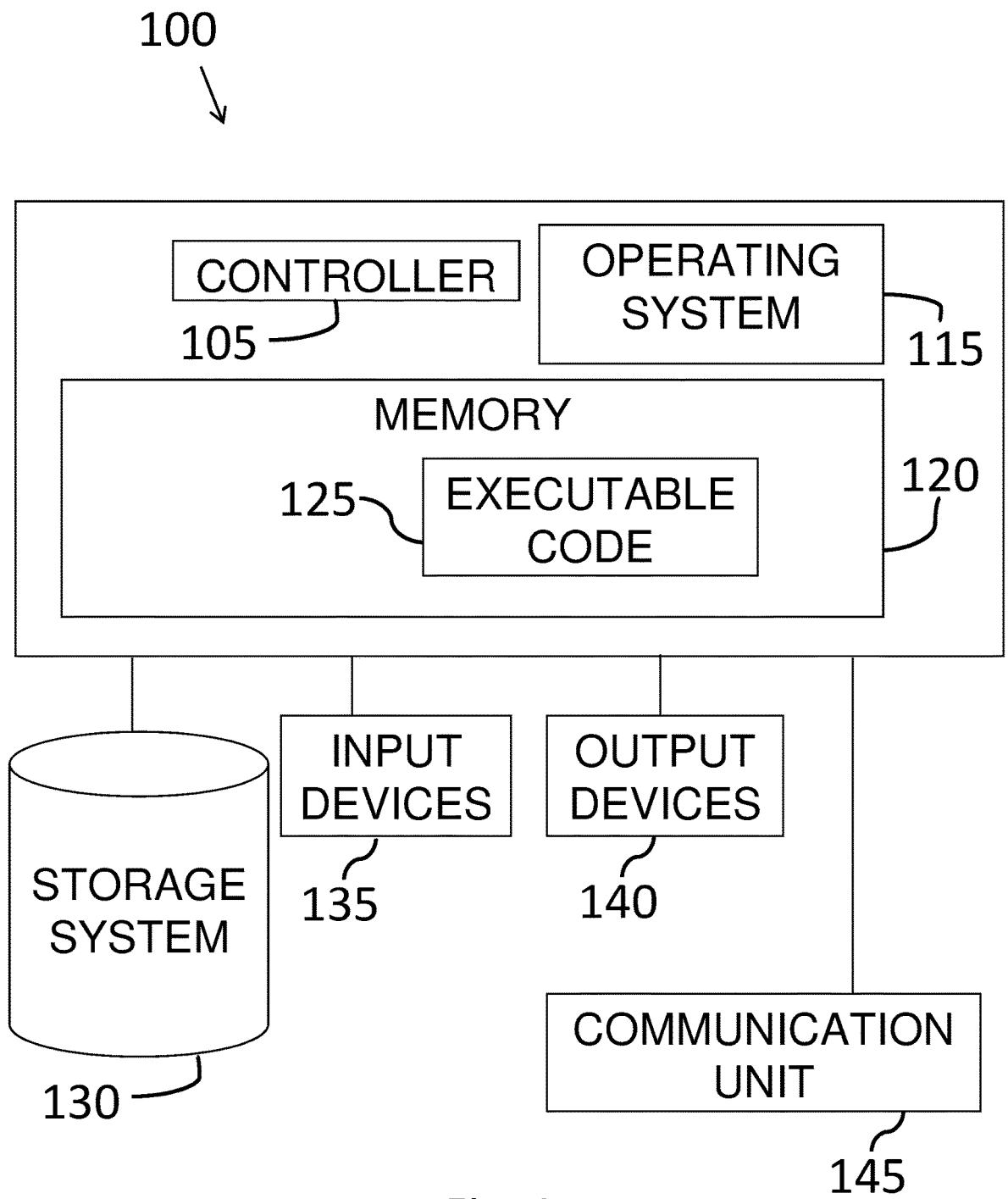
FIG. 1 shows a block diagram of an example computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100, for example, to act as the various devices and/or the components shown in FIGS. 2A-2B. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

According to some embodiments, systems and methods are provided for recovery of cryptographic keys for a service that holds a cryptographic key for many clients and performs actions on their behalf. All private keys may be recovered at once using a third-party solution, where each client may be supplied with an encrypted version of the server key and all keys are encrypted with the same recovery public key. Thus, the client may cryptographically verify that indeed the encrypted key may be decrypted to provide the relevant service key in the presence of the corresponding decryption private key. Such solution may be relevant for many server-client configurations, including custodial services in which servers hold the clients' private keys, or non-custodial services in which servers hold only part of the secret information that is required to sign a transaction such as 'MultiSig' or secure multi-party computation (sMPC) based solutions.

Figure 2:
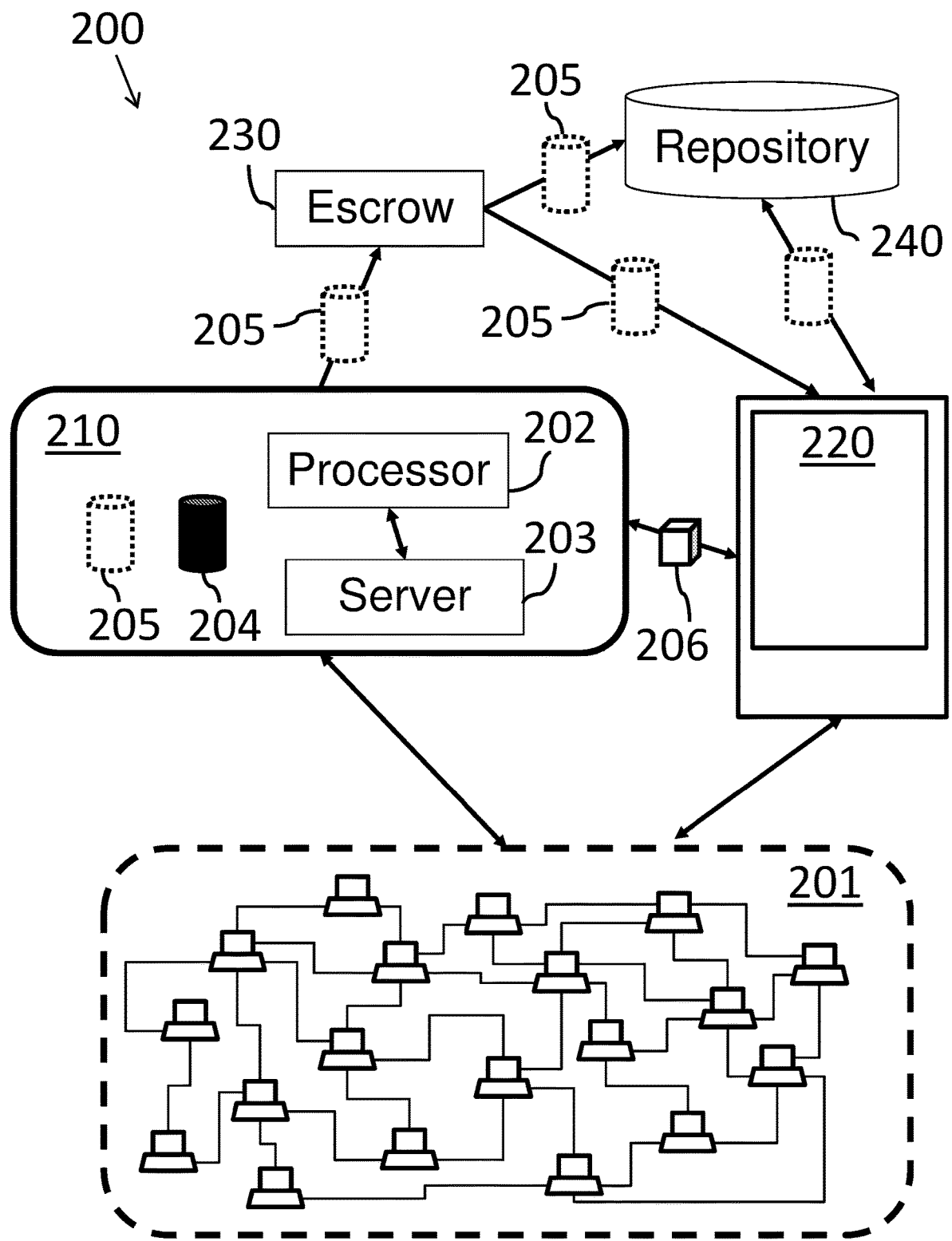
FIG. 2 shows a block diagram of a cryptographic key management system, according to some embodiments of the invention.

Reference is now made to FIG. 2, which shows a block diagram of a cryptographic key management system 200, according to some embodiments. In FIG. 2, the direction of arrows may indicate the direction of information flow. The key management system 200 may be configured to recover a cryptographic key associated with a blockchain based computer network for the case of main server unavailability.

The cryptographic key management system 200 may include at least one first computing device 210 (e.g., such as computing device 100 shown in FIG. 1) in communication with at least one second computing device 220 (e.g., a mobile computing device such as a smartphone), where in some embodiments at least one first computing device 210 and/or second computing device 220 may be in communication with a distributed ledger technology (DLT) based network 201 (e.g., a blockchain based network). It should be noted that while only one first computing device 210 and only one second computing device 220 are shown in the figures, system 200 may include any number of computing devices with similar operation.

The at least one first computing device 210 may include a processor 202 (e.g., such as controller 105 shown in FIG. 1) and/or a server 203, and be configured to generate at least one cryptographic pair of a recovery public key 204 and a recovery private key 205. For instance, the at least one cryptographic key pair may be generated once at initialization of the system. If the at least one first computing device 210 becomes unavailable, the cryptographic key management system 200 may allow recovery of cryptographic keys with dedicated management of the at least one cryptographic pair of a recovery public key 204 and a recovery private key 205, as further described hereinafter.

In some embodiments, at least a portion of a cryptographic key 206 of the computer network 201 is encrypted with the recovery public key 204 by at least one first computing device 210, for instance encrypting the cryptographic key 206 when keys are updated (e.g., with new key generation and/or key rotation). The encrypted at least a portion of the cryptographic key 206 may be sent to the at least one second computing device 220 (e.g., a smartphone), for instance the at least one second computing device 220 may thereby store an encrypted version of the cryptographic private key of the computer network 201. In some embodiments, the at least one second computing device 220 retrieves the recovery public key 204, for instance as a certificate, via a dedicated API of operated by the at least one first computing device 210. It should be noted that the cryptographic key may be split into a plurality of shares or portions, between a plurality of computing devices, with the multi-party computation protocol.

In some embodiments, a dedicated mobile app is implemented on the at least one second computing device 220 to allow, for example, recovery of the cryptographic keys when needed. Such dedicated mobile app, (e.g., dedicated "recovery" mobile app) may access data on the at least one second computing device 220 including at least portion of the cryptographic keys stored thereon, and chain code (e.g., to derive future child keys). The dedicated "recovery" mobile app may decrypt encrypted keys using the recovery private keys, compute master keys from decrypted at least portion of the cryptographic keys and/or derive all child keys from the master key. The dedicated "recovery" mobile app may output all private keys, for instance to a text file, for easy of use by the user of at least one second computing device 220.

In some embodiments, the at least a portion of the cryptographic key 206 is divided into 'm' segments, such that each segment may be encrypted using the recovery public key 204 (e.g., using any chosen plaintext attack (CPA) secure additive homomorphic scheme, such as homomorphic ElGamal encryption).

In some embodiments, the signing algorithm for the recovery private key 205 has the same generic elliptic curve function as for signing of the encrypted at least a portion of the cryptographic key 206. Using a "universal HD" property for the signing algorithm (e.g., all individual wallets keys may be derived from a single master key), it may be sufficient to have a single recovery private key 205 of the type of that master key. For example, use the widely used 'Secp256k1' key supported by OpenSSL. The signing algorithm may be chosen in accordance to the type of the respective key.

If at least one first computing device 210 becomes unavailable, the keys for the at least one second computing device 220 may be released to clients by another third party. According to some embodiments, system 200 includes at least one recovery escrow service 230 as the third party that may operate separately from the at least one first computing device 210 and/or at least one second computing device 220. The recovery escrow service 230 may be implemented on a separate hardware device (e.g., on an external computing device) and/or implemented as a separate software module at the at least one first computing device 210. In some embodiments, the recovery escrow service 230 stores the recovery private key, and instructions to publish the recovery private key may be provided by a third party.

In some embodiments, the recovery escrow service 230 is implemented as a software escrow service (e.g., such as escrow services provided by NCC, or the like) for instance in agreement regarding storage of cryptographic keys with the at least one first computing device 210. The recovery escrow service 230 may carry out at least one of: securely storing cryptographic keys, execution of custom tests to validate the keys, and conditional release of the keys (e.g., publication of the keys) under the defined terms. In some embodiments, the recovery escrow service 230 is implemented in accordance with at least one smart contract, such that when new keys are added the previous keys are not be removed.

In some embodiments, communication between the at least one first computing device 210 and the recovery escrow service 230 is carried out with serverless lambda functions, for increased security as there is no server to be compromised, only code. In some embodiments, the at least one cryptographic key pair is generated (e.g., using OpenSSL with a lambda function) with the key pair stored in a structured manner that includes at least one of: private key, public key, and/or the type of the elliptic curve used for the signing algorithm, for example stored in a standard format of certificates (e.g., PKCS #12). The communication between the at least one first computing device 210 and the at least one second computing device 220 may not contain "secret" data and only the encrypted at least a portion of the cryptographic key 206 and/or the recovery public key 204, while the recovery private key 205 may be shared with the recovery escrow service 230.

Figure 3:
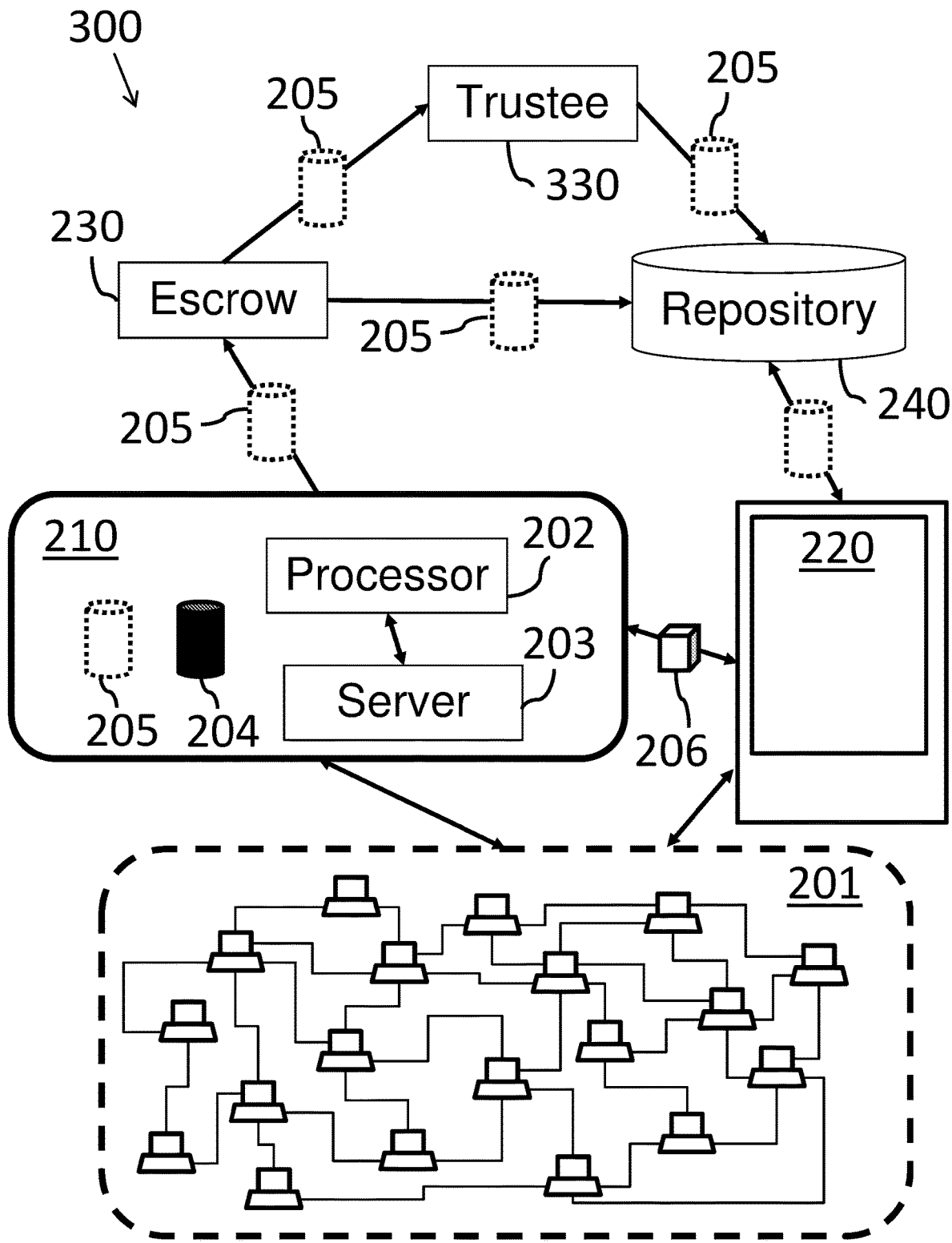
FIG. 3 shows a block diagram of another cryptographic key management system, according to some embodiments of the invention.

In some embodiments, the third party also includes human interaction as a "trustee" to the system (e.g., a trusted attorney office in agreement with the at least one first computing device 210) to publish keys when the at least one first computing device 210 becomes unavailable in addition to the automatic process carried out by hardware and/or software components, for instance in addition to the recovery escrow service 230, such that the client is able to cryptographically verify that the recovery escrow service 230 and/or the trustee solution holds the relevant decryption private key (e.g., as proof of key possession) as further described in FIG. 3.

According to some embodiments, the recovery private key 205 is sent by the at least one first computing device 210 to the recovery escrow service 230 for storage, for instance via SSH-FTP. The recovery escrow service 230 may store the recovery private key 205 while the at least one first computing device 210 and the at least one second computing device 220 communicate with the computer network 201 (e.g., carry out a transaction in a blockchain based network). It should be noted that the information stored at the recovery escrow service 230 may be substantially small (as its purpose is not to fully replace the functionality of the at least one first computing device 210), for instance a single decryption private key, while it may be used for the recovery of keys of many users, that in turn may hold many different keys. The stored information may also be static without the need to be updated with respect to changes in user details (e.g., such as adding users, removing users, changing keys, etc.), thereby allowing, for example, an efficient solution in storage and communication by the recovery escrow service 230 (e.g., implemented as a software). It should be noted that the recovery escrow service 230 may not hold the client private keys (e.g., storage of private key may not be static and/or substantially small), for instance the recovery escrow service 230 may not hold private keys of at least one second computing device 220, so that the recovery escrow service 230 may not take advantage of data of the at least one second computing device 220 in order to, for example, block access to private data (or financial assets related to the blockchain network) in case the recovery escrow service 230 goes rogue and/or being maliciously hacked.

Once the at least one first computing device 210 is unavailable (e.g., due to a malfunction or a malicious hacking attempt), for instance detected by the recovery escrow service 230 or by another external party, the recovery escrow service 230 may publish the recovery private key 205 in order to allow operation without the at least one first computing device 210. For instance, the recovery escrow service 230 may send the recovery private key 205 to the at least one second computing device 220 to be used in order to decrypt the encrypted at least a portion of the cryptographic key 206 so as to maintain operation with the computer network while the at least one first computing device 210 is unavailable.

In some embodiments, the recovery escrow service 230 publishes the recovery private key 205 in a public repository 240 upon detection (e.g., detection by the recovery escrow service 230) of the at least one first computing device 210 being unavailable, instead of the recovery escrow service 230 directly sending the recovery private key 205 to the at least one second computing device 220. For instance, upon detection of the at least one first computing device 210 being unavailable the recovery escrow service 230 may send the recovery private key 205 in a public repository 240 such that in order to carry out recovery of the keys, the at least one second computing device 220 may simply retrieve the recovery private key 205 from the public repository 240 without direct communication between the at least one second computing device 220 and the recovery escrow service 230. The public repository 240 may be a publicly available service (e.g., such as 'GitHub') that may be used to publish data to clients of the system, for instance publish data to users of the at least one second computing device 220. The published data may include periodic reports and/or the recovery keys when needed. In some embodiments, the at least one second computing device 220 mathematically verifies that indeed the encrypted key stored therein, may be decrypted to the relevant private key when the decryption key is provided (e.g., from the recovery escrow service 230).

In order to, for example, decrypt the encrypted at least a portion of the cryptographic key 206, the at least one second computing device 220 may utilize the retrieved (e.g., from the recovery escrow service 230 and/or the public repository 240) recovery private key 205. In some embodiments, the recovery process is universal and/or generic to different types of blockchain networks, for instance with a signing algorithm (e.g., at the at least one first computing device 210) based on a generic elliptic curve function.

According to some embodiments, users of at least one second computing device 220 is able to verify without actually supplying the decryption key that in case that the decryption key is provided, the encrypted at least a portion of the cryptographic key 206 may be decrypted to the private key that corresponds to the relevant public key, since given that correct private key the users of at least one second computing device 220 may recreate all of its individual keys using the universal HD property. For example, all individual keys may be recreated by multiplying the decrypted at least a portion of the cryptographic key 206 with the corresponding private key to create the master private key and derive all individual keys.

Reference is now made to FIG. 3, which shows a block diagram of another cryptographic key management system 300, according to some embodiments. In FIG. 3, the direction of arrows may indicate the direction of information flow. The key management system 300 may be configured to recover a cryptographic key associated with a blockchain based computer network for the case of main server unavailability where in addition to a fully automated system a human operated process may be included for enhanced security.

In some embodiments, the key management system 300 includes a trustee 330 (e.g., an independent legal entity such as a trusted attorney office), which is in agreement with the at least one first computing device 210 to instruct the recovery escrow service 230 under predefined conditions, for instance when the at least one first computing device 210 becomes unavailable. The trustee 330 may receive the recovery private key 205 from the recovery escrow service 230 and/or directly from the at least one first computing device 210. In some embodiments, in order to verify that the trustee 330 is to publish the recovery private key 205 when needed, the trustee 330 periodically publishes a general status report (e.g., a financial report of the company maintaining the servers of the system) related to the at least one first computing device 210 at the repository 240. The status report may then be retrieved by the at least one second computing device 220 in order to verify that the trustee is indeed in agreement with the at least one first computing device 210.

If the recovery escrow service 230 loses access to the recovery private key 205, the periodic report publication mechanism may detect that a problem occurred, and a new recovery key pair may be generated by the at least one first computing device 210 and refresh the encrypted portion on next rotation.

According to some embodiments, the trustee 330 publishes the recovery private key 205 in repository 240 and/or instruct the recovery escrow service 230 to publish the recovery private key 205, for instance when the at least one first computing device 210 becomes unavailable, such that the keys for the at least one second computing device 220 may be released to clients. Upon receipt of the at least one second computing device 220 receives the recovery private key 205, the decryption of the encrypted at least a portion of the cryptographic key 206 may be enabled.

In some embodiments, in order to verify that the recovery escrow service 230 holds the recovery private key 205, the at least one first computing device 210 periodically (e.g., monthly) sends a recovery message, such as a random string of text, for storage at the recovery escrow service 230. For example, the recovery message may be sent via SSH-FTP interface with a lambda function retrieved for instance from an API of a news site (e.g., such as the "New-York Times") in order to show a publicly verifiable time stamp. The recovery escrow service 230 may sign the received recovery message with the recovery private key 205 and accordingly send a report including the signed message (e.g., a signed string) to the trustee 330. The recovery message, such as a random string of text, may be any random message and therefore not a secret so that sending the recovery message may be carried out by regular (non-secret) methods, for instance send the message via mail.

The trustee 330 may publish the report with the signed message in the repository 240. Thus, any user of the system may use the at least one second computing device 220 to retrieve the report from repository 240 (e.g., from 'GitHub') in order to verify that recovery escrow service 230 indeed holds the recovery private key 205, for instance compatible to the recovery public key 204 already stored at the at least one second computing device 220.

In some embodiments, the at least one second computing device 220 is connected to the computer network 201 and a transaction is added to a ledger of the computer network 201, in accordance with the received signed at least a portion of the cryptographic key 206, for instance as in a cryptographic wallet.

Figure 4A:
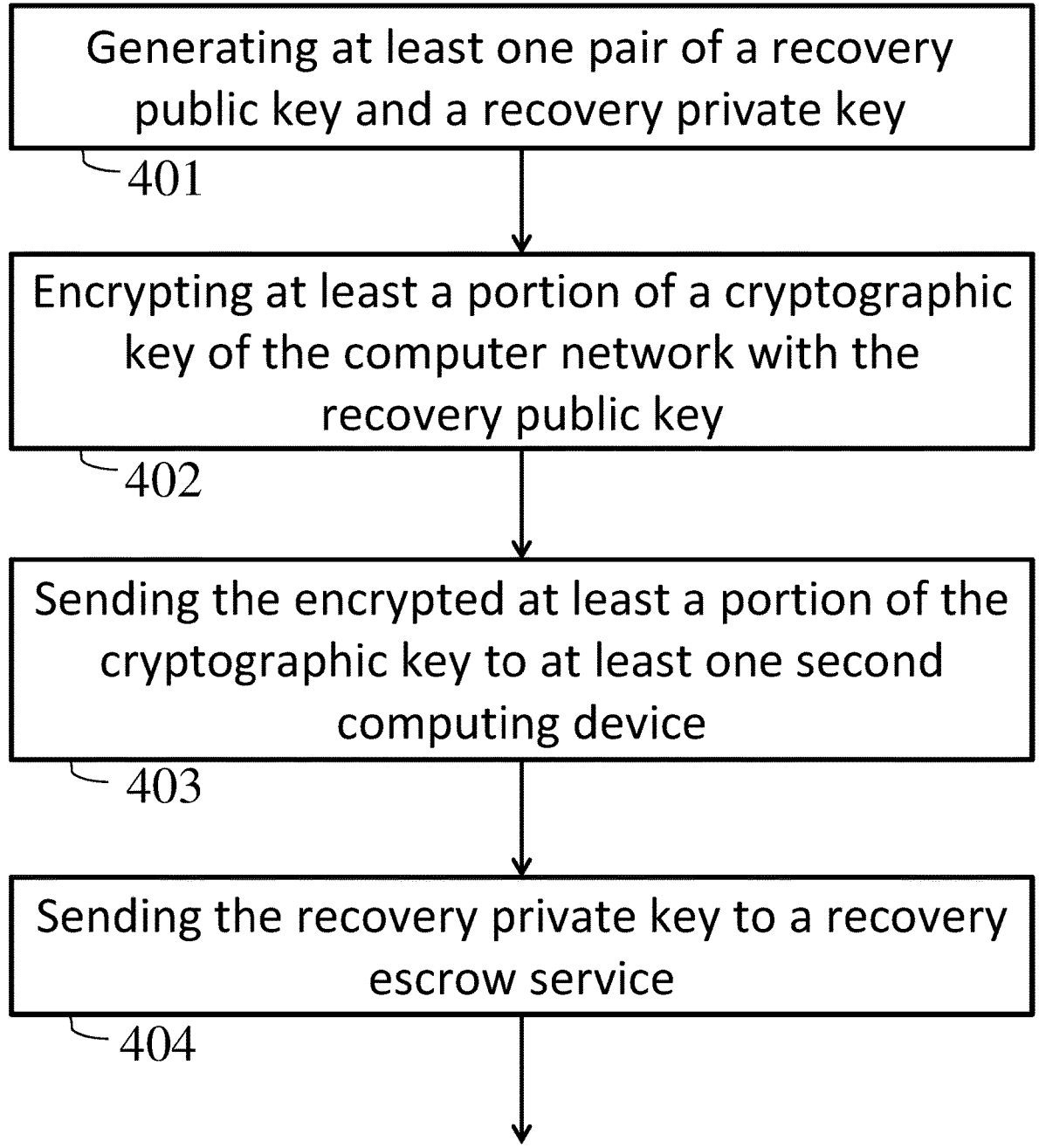
FIGS. 4A-4B show a flowchart for method of recovering a cryptographic key associated with a blockchain based computer network, according to some embodiments of the invention.
Figure 4B:
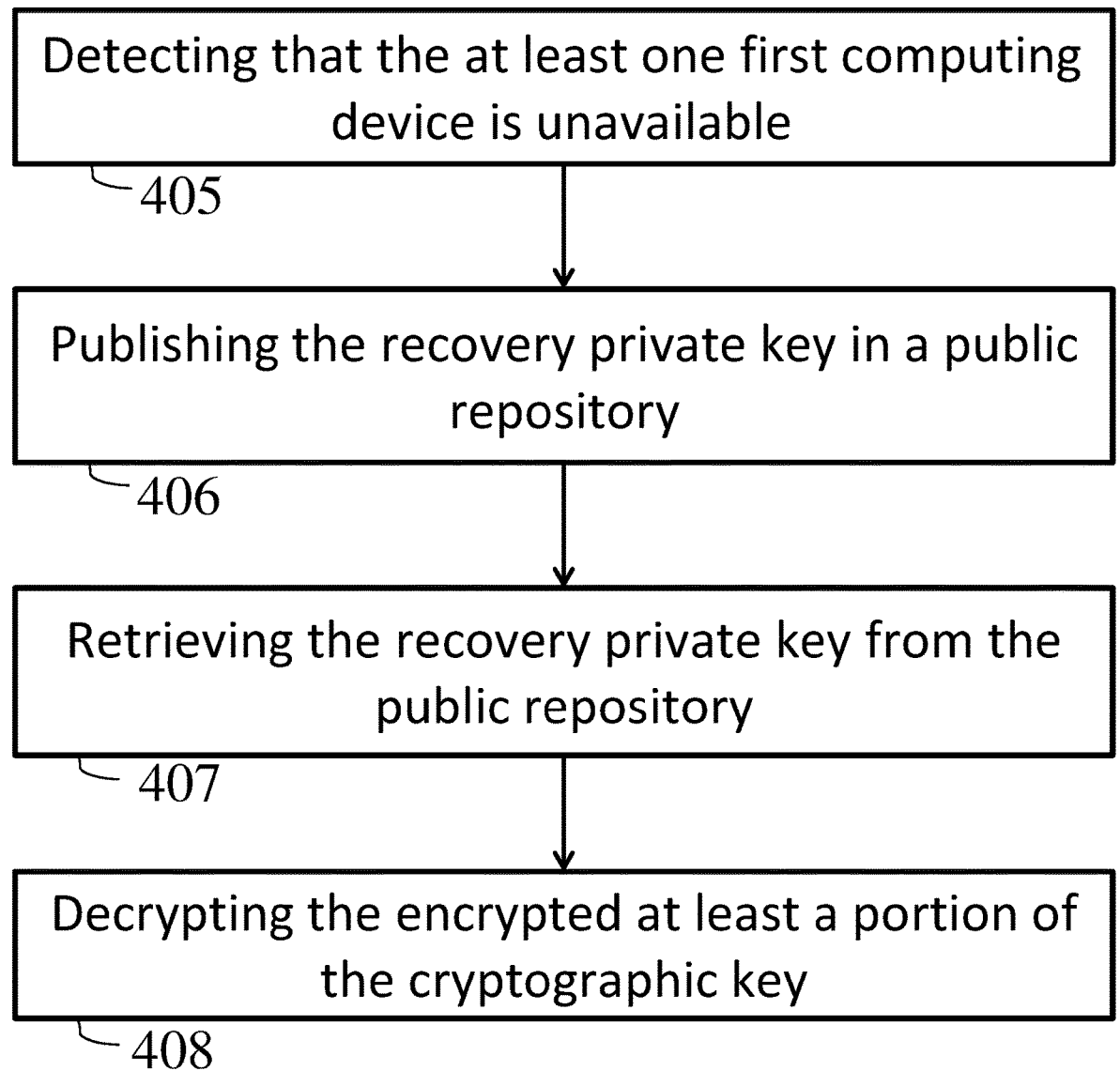

Reference is now made to FIGS. 4A-4B, which show a flowchart for method of recovering a cryptographic key associated with a blockchain based computer network, according to some embodiments. At least one pair of a recovery public key 204 and a recovery private key 205 may be generated 401, for instance by at least one first computing device 210. At least a portion of a cryptographic key 206 of the computer network may be encrypted 402 with the recovery public key 204, for instance by at least one first computing device 210.

The encrypted at least a portion of the cryptographic key 206 may be sent 403 to at least one second computing device 220 and the recovery private key 205 may be sent 404 to a recovery escrow service 230, for instance by at least one first computing device 210. The at least one first computing device 210 may be detected 405 as unavailable, for instance by the recovery escrow service 230 and/or by the at least one second computing device 220.

The recovery private key 205 may be published 406 in a public repository 240, for instance by the by the recovery escrow service 230. The recovery private key 205 may be retrieved 407 from the public repository 240, for instance by the at least one second computing device 220, and the encrypted at least a portion of the cryptographic key 206 may be decrypted 408, for instance by the at least one second computing device 220.

Figure 5:
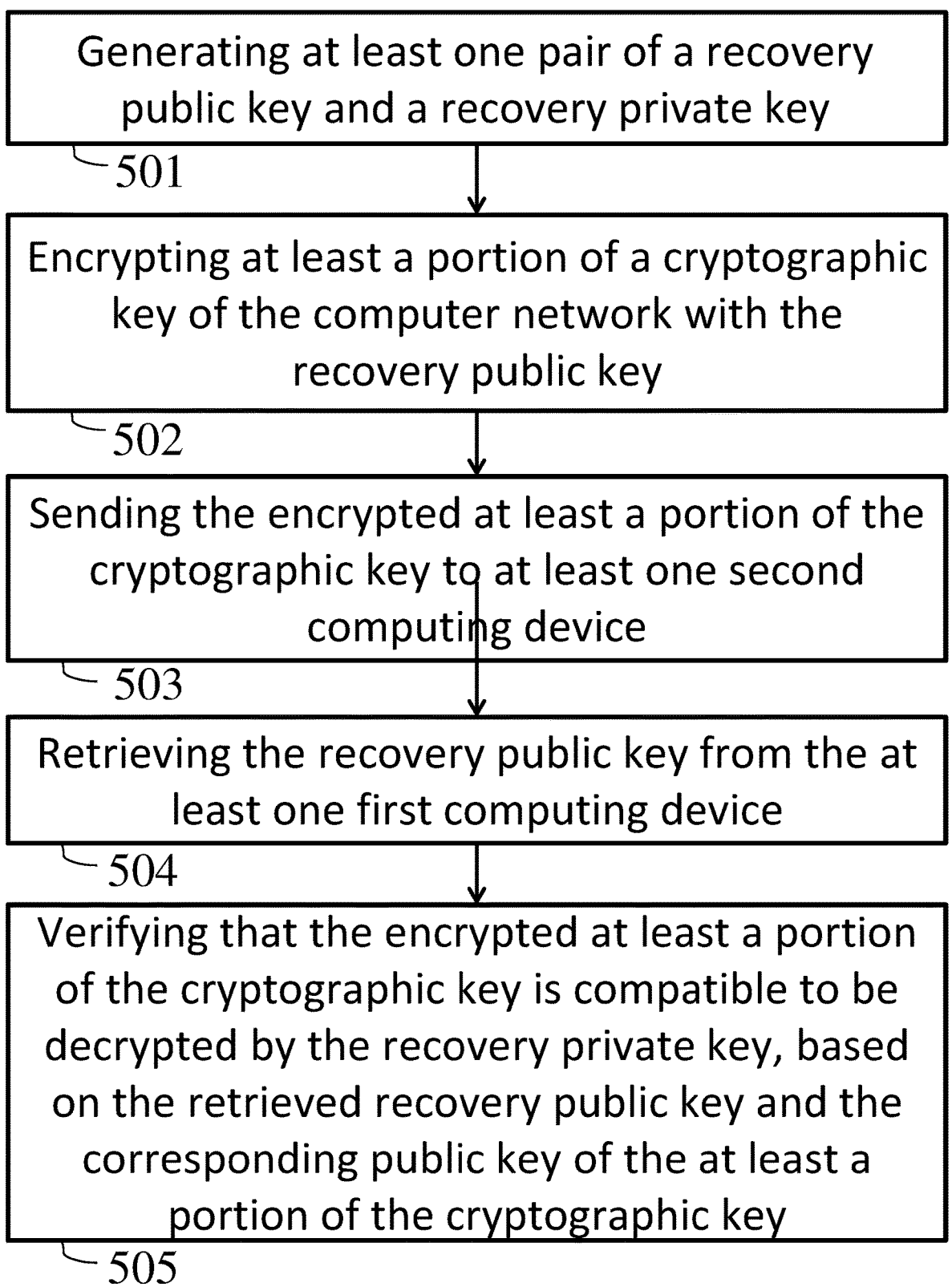
FIG. 5 shows a flowchart for method of verifying that an encrypted cryptographic private key associated with a blockchain based computer network can be decrypted, according to some embodiments of the invention.

Reference is now made to FIG. 5, which shows a flowchart for method of verifying that an encrypted cryptographic private key associated with a blockchain based computer network can be decrypted, according to some embodiments. At least one pair of a recovery public key 204 and a recovery private key 205 may be generated 501, for instance by at least one first computing device 210. At least a portion of a cryptographic key 206 of the computer network 201 may be encrypted 502 with the recovery public key 204, for instance by at least one first computing device 210. In some embodiments, the encryption is carried out using an homomorphically additive encryption scheme (e.g., using ElGamal encryption).

For example, generation of key pairs with the at least one first computing device 210 may include an elliptic curve key pair $x_1, P_1$ where $P_1=x_1G$ and the at least one second computing device 220 may include another elliptic curve key pair $x_2, P_2$ where $P_2=x_2G$ with the full recovery private key being a function of $x_1$ and $x_2$. The at least one first computing device 210 may share a ciphertext 'c' encrypting $x_1$ with public key '$pk_e$' with the recovery escrow service 230 (e.g., the decision on the release of private key '$k_e$' may be carried out by the trustee 330). Once '$k_e$' becomes public, each user may be able to locally decrypt '$x_1$' on the at least one second computing device 220 and compute the corresponding private key $k=f(x_1, x_2)$. In order to verify proper recovery operation, the system requirements may include verification that 'c' encrypts '$x_1$' and that the recovery escrow service 230 be able to prove possession of the private key '$k_e$'. For encryption, the homomorphic ElGamal "in the exponent" protocol may be used, where the at least a portion of the cryptographic key 206 may be divided into 'm' segments such that each segment may be encrypted using the recovery public key 204 '$Q_k$' such that $Q_k=k_eG$ to achieve $(D_1, E_i)=([x_1]_iG+r_iQ_k, r_iG)$. To prove extractability, the at least one first computing device 210 may send proofs as follows: zero knowledge proof that '$x_1$' segments are small enough to be recovered. For every encrypted segment Zero knowledge proof of knowledge of segment and randomness used in the encryption scheme. Zero knowledge proof that addition of all encrypted segments results in encryption of '$x_1$'. Proof are sent to the at least one second computing device 220, as. Once the recovery private key 205 becomes public (e.g., published by the trustee 330), the at least one second computing device 220 may decrypt segment $[x_1]_i$, from $D_i-k_eE_i$ for instance using a "dlog extraction" algorithm over a small space of options.

The encrypted at least a portion of the cryptographic key 206 may be sent 503 to at least one second computing device 220, for instance by at least one first computing device 210. The recovery public key 204 may be retrieved 504 from the at least one first computing device 210, for instance by at least one second computing device 220. In some embodiments, the system verifies 505 that the encrypted at least a portion of the cryptographic key 206 is compatible to be decrypted by the recovery private key 205, based on the retrieved recovery public key 204 and the corresponding public key of the at least a portion of the cryptographic key 206, for instance by at least one second computing device 220. For example, the system may perform verification of the existence of a suitable decryption key (e.g., at the recovery escrow service 230) compatible with the encrypted at least a portion of the cryptographic key 206, where any user of the system may use the at least one second computing device 220 to retrieve a published report from repository 240 (e.g., from 'GitHub') in order to verify that recovery escrow service 230 indeed holds the recovery private key 205.

In some embodiments, the recovery private key 205 is sent to a recovery escrow service 230 (e.g., by the at least one first computing device 210) and an arbitrary message may be periodically (e.g., monthly) sent to the recovery escrow service 230, with the recovery message signed by the recovery private key 205. For instance, sending a status report or a random text string as the arbitrary message. The signed arbitrary message may be published in a public repository 240 and retrieved by the at least one second computing device 220. Finally, users of the at least one second computing device 220 may verify that the encryption of the signed arbitrary message is compatible with the recovery public key 204 and also verify that the recovery escrow service 230 has the recovery private key 205.

In some embodiments, system 200 improves computer network technology and the technological problem of cryptographic key recovery when signatures are blocked if at least one portion of the key in unavailable (e.g., when the at least one first computing device 210 is unavailable) by generating another encrypted pair of cryptographic keys and distributing these keys in the system. Even in case that a hacking attack is carried out and the hackers get access to the at least one second computing device 220, the attackers are still unable to take advantage of the stolen data (e.g., a cryptographic wallet) on their own since the at least a portion of a cryptographic key 206 is now encrypted, thereby this system may add another layer of security with a similar situation to not having the encrypted at least a portion of a cryptographic key 206. It should be noted that system 200 may prevent the requirement of having full duplicates of data as backup and/or recovery since only small amount of data, not growing with increase in amount of users, needs to be saved with the recovery cryptographic keys.

In case that the recovery private key 205 is unjustifiably published, for instance due to a malfunction and/or due to a malicious attack, the recovery public key 204 may be also revealed. Thus, all users of the at least one second computing device 220 may be able to continue operation (e.g., use their cryptographic wallets as usual) as if the recovery system did not exist. It should be noted that even if the recovery private key 205 is revealed, attackers will still need to compromise the at least one second computing device 220 in order to get access of their private key before any damage can be done.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of verifying that an encrypted cryptographic private key associated with a blockchain based computer network can be decrypted, the method comprising:
   encrypting, by at least one first computing device, at least a portion of a cryptographic key of the computer network with a recovery public key, wherein the encryption is carried out using an homomorphically additive encryption scheme;
   sending, by the at least one first computing device, the encrypted at least a portion of the cryptographic key to at least one second computing device;
   retrieving, by the at least one second computing device, the recovery public key from the at least one first computing device;
   verifying, by the at least one second computing device, that the encrypted at least a portion of the cryptographic key is compatible to be decrypted by a recovery private key, based on the retrieved recovery public key and the corresponding public key of the at least a portion of the cryptographic key;
   sending, by the at least one first computing device, the recovery private key to a recovery escrow service;
   periodically sending, by the at least one first computing device, an arbitrary message to the recovery escrow service, wherein the recovery message is signed by the recovery private key;
   publishing the signed arbitrary message in a public repository;
   retrieving, by the at least one second computing device, the signed arbitrary message from the public repository;
   verifying, by the at least one second computing device, that the encryption of the signed arbitrary message is compatible with the recovery public key; and
   verifying, by the at least one second computing device, that the recovery escrow service has the recovery private key.

2. The method of claim 1 wherein the recovery escrow service stores the recovery private key, and wherein instructions to publish the recovery private key are provided by a third party.

3. The method of claim 2, further comprising periodically publishing, by the third party, a status report of the at least one first computing device in a public repository to be retrieved by the at least one second computing device.

4. The method of claim 1, wherein the recovery escrow service is on an external computing device.

5. The method of claim 1, wherein the at least one second computing device comprises a mobile computing device.

6. The method of claim 1, further comprising:
   connecting the at least one second computing device to the computer network; and
   adding a transaction to a ledger of the computer network, in accordance with the received signed at least a portion of the cryptographic key.

7. The method of claim 1, wherein the encryption is carried out using a verifiable homomorphic ElGamal encryption.

8. A system for verification that a cryptographic key associated with a blockchain based computer network can be decrypted, the system comprising:
   at least one first computing device, configured to:
      encrypt at least a portion of a cryptographic key of the computer network with a recovery public key, wherein the encryption is carried out using an homomorphically additive encryption scheme;

at least one second computing device, in communication with the at least one first computing device, and configured to:

receive the encrypted at least a portion of the cryptographic key from the at least one first computing device;

retrieve a recovery public key from the at least one first computing device; and verify that the encrypted at least a portion of the cryptographic key is compatible to be decrypted by the recovery private key, based on the retrieved recovery public key and the corresponding public key of the at least a portion of the cryptographic key, wherein:

the at least one first computing device is further configured to send the recovery private key to a recovery escrow service and to periodically send an arbitrary message to a recovery escrow service, wherein the arbitrary message is signed by the recovery private key;

the recovery escrow service is further configured to publish the signed arbitrary message in a public repository; and the at least one first computing device is further configured to:

retrieve the signed arbitrary message from the public repository;

verify that the encryption of the signed arbitrary message is compatible with the recovery public key; and verify that the recovery escrow service has the recovery private key.

9. The system of claim 8, wherein the recovery escrow service stores the recovery private key, and wherein instructions to publish the recovery private key are provided by a third party.

10. The system of claim 9, wherein a status report of the at least one first computing device in a public repository is periodically published by the third party.

11. The system of claim 8, wherein the recovery escrow service is on an external computing device.

12. The system of claim 8, wherein the at least one second computing device comprises a mobile computing device.

13. The system of claim 8, wherein the at least one second computing device is connected to the computer network, and wherein a transaction is added to a ledger of the computer network, in accordance with the received signed at least a portion of the cryptographic key.

\* \* \* \* \*